United States Patent
Saïghi et al.

(10) Patent No.: US 10,366,326 B2
(45) Date of Patent: Jul. 30, 2019

(54) UNIT HAVING AN ARTIFICIAL NEURON AND A MEMRISTOR

(71) Applicants: Universite de Bordeaux, Bordeaux (FR); INSTITUT POLYTECHNIQUE DE BORDEAUX, Talence (FR); CENTRE NATIONAL DE LA RECHERCHE SCIENTIFIQUE (CNRS), Paris (FR); Sylvain Saïghi, Talence (FR); Jean Tomas, Pessac (FR); Gwendal Lecerf, Bordeaux (FR)

(72) Inventors: Sylvain Saïghi, Talence (FR); Jean Tomas, Pessac (FR); Gwendal Lecerf, Bordeaux (FR)

(73) Assignees: Universite de Bordeaux, Bordeaux (FR); Institut Polytechnique de Bordeaux, Talence (FR); Centre National de La Recherche Scientifique (CNRS), Paris (FR)

( * ) Notice: Subject to any disclaimer, the term of this patent is extended or adjusted under 35 U.S.C. 154(b) by 742 days.

(21) Appl. No.: 14/769,968

(22) PCT Filed: Mar. 5, 2014

(86) PCT No.: PCT/FR2014/050503
§ 371 (c)(1),
(2) Date: Aug. 24, 2015

(87) PCT Pub. No.: WO2014/135801
PCT Pub. Date: Sep. 12, 2014

(65) Prior Publication Data
US 2016/0004960 A1    Jan. 7, 2016

(30) Foreign Application Priority Data
Mar. 5, 2013  (FR) .................... 13 51979

(51) Int. Cl.
*G06N 3/063* (2006.01)
*G06N 3/08* (2006.01)

(52) U.S. Cl.
CPC ............. *G06N 3/0635* (2013.01); *G06N 3/08* (2013.01)

(58) Field of Classification Search
None
See application file for complete search history.

(56) References Cited

U.S. PATENT DOCUMENTS

| 5,206,541 | A | 4/1993 | Boahen et al. |
| 8,930,291 | B1 * | 1/2015 | Srinivasa ............... G06N 3/063 706/15 |
| 9,189,732 | B2 * | 11/2015 | Bichler .................. G06N 3/049 |

FOREIGN PATENT DOCUMENTS

WO   WO-2010142762 A1   12/2010

OTHER PUBLICATIONS

Ozra Sharifipoor et al., "An analog implementation of biologically plausible neurons using CCII building blocks", Razi University, Aug. 2012, Elesevier Neural Networks, vol. 36, pp. 129-135.

(Continued)

*Primary Examiner* — James G Norman
(74) *Attorney, Agent, or Firm* — Harness, Dickey & Pierce, P.L.C.

(57) ABSTRACT

An artificial neuron unit comprising one artificial neuron having at least one output port and at least one input port, and one memristor having two terminals; said unit being characterized in that it also comprises at least one current conveyor having two input ports X and Y, and one output port Z; and in which said memristor is connected by one of its terminals to the input port X of said current conveyor, said current conveyor is connected by its output port Z to an input port of said artificial neuron and said artificial neuron (Continued)

is connected by one of its output ports to the input port Y of said current conveyor or to another of said terminals of said memristor.

14 Claims, 4 Drawing Sheets

(56) References Cited

OTHER PUBLICATIONS

Yu. V. Pershin et al., "Emulation of floating memcapacitors and meminductors using current conveyors", The Institution of Engineering and Technology,Feb. 17, 2011, Electronics Letters, vol. 47 No. 4, doi: 10.1049/el.2010.7328.
Andreas G. Andreou et al., "Current-Mode Subthreshold MOS Circuits for Analog VLSI Neural Systems", IEEE Transactions on Neural Networks, Mar. 1991, vol. 2 No. 2, pp. 205-213.
Carlos Zamarreno et al., "On spike-timing-dependent-plasticity, memristive devices, and building a self-learning visual cortex", Mar. 17, 2011, Fronteirs in Neroscience: Original Research Article, vol. 5 Article. 26, pp. 1-22, doi: 10.3389/fnins.2011.00026.
International Search Report PCT/ISA/210 for International Application No. PCT/FR2014/050503 dated Aug. May 26, 2014.

\* cited by examiner

UNIT HAVING AN ARTIFICIAL NEURON AND A MEMRISTOR

This application is the U.S. National Phase application of PCT Application No. PCT/FR2014/050503 filed Mar. 5, 2014, which claims priority to the French application 1351979 filed on Mar. 5, 2013, which applications are incorporated herein by reference and made a part hereof.

BACKGROUND OF THE INVENTION

1. Field of the Invention

The invention relates to artificial neurons and neural networks.

2. Description of the Related Art

Neural networks are still little used in industry in the absence of any viable technical solution, whether in terms of consumption or of development cost-performance ratio. When neural networks are used, they are implemented on the software level in a conventional computation architecture which performs a serial computation of the operations. Consequently, performance levels can, in large scale networks, be degraded because of the quantity of operations to be performed. Furthermore, the robustness of the system is weak in the event of failure of an element of the computation unit.

In order to construct more effective systems, efforts are now being made to draw on the biological principles by performing certain approximations on the model used to simulate living cells activity. This is what is leading in particular to the use of spiking neural networks.

The invention thus relates in particular to neuromorphic chips. The latter comprise analog or mixed neural networks and are likely to be used in artificial intelligence, for example in shape recognition devices. Neuromorphic chips comprise three parts: artificial neurons, synapses and memory elements which store the synaptic weight. Furthermore, the synaptic weights evolve during the learning period of the system by virtue of an algorithm which is implemented in another part of the system.

To this end, consideration has been given to store the information either by digital memory points, or by an analog memory consisting of a capacitor which voltage must be refreshed at the terminals or of a floating-gate transistor. These three solutions require a plasticity computation to be performed in another part of the system (as indicated above) and the result of the computation becomes the new value to be stored.

However, these solutions generate either a high current consumption, or a complexity of implementation, or even a lack of accuracy of the stored value.

To try to mitigate these drawbacks, the idea of using the new component called memristor, updated to this name in 2008, has been devised. This member comprises a nonvolatile resistance which varies nonlinearly as a function of the applied voltage. When a voltage is applied to it, its resistance varies continuously and the device stores the resistance value once the voltage has disappeared. It therefore exhibits an intrinsic plasticity. This member can therefore behave as an artificial synapse. It has the advantage of being of very small size (a few hundreds of nanometers squared) and of consuming very little current since it is a passive element (a resistor) of several kilo ohms. This component therefore makes it possible to consider producing artificial neural networks of large dimensions. With spiking neural networks based on an architecture with analog circuits coupled to memristors, it becomes possible to envisage high-performance computation accelerators capable of performing heavy and complex tasks.

Nevertheless, the development of such systems is still in its infancy. The document "On spike-timing-dependent-plasticity, memristive devices, and building a self-learning visual cortex ," C. Zamarreno-Ramos, L. A. Camunas-Mesa, J. A. Perez-Carrasco, T. Masquelier, T. Serrano-Gotarredona, and B. Linares-Barranco, Frontiers in Neuroscience, vol. 5, No. 00026, 2011, presents a solution for combining the spiking neural networks with memristors to produce exciting and inhibiting synapses. However, the solution described requires the design of the silicon neurons to be drastically modified to obtain the two types of synapses.

SUMMARY OF THE INVENTION

One aim of the invention is to simplify and improve the use of the memristors implemented in the artificial neural networks. More particularly, the invention aims to improve [artificial neuron/memristor] couplings forming the synapses encountered in the artificial neural networks.

To this end, an artificial neuron unit is proposed which comprises:
- at least one artificial neuron,
- at least one current conveyor connected to an input of the neuron, and
- at least one memristor connected to the current conveyor.

Within the meaning of the present invention, "artificial neuron" should be understood to mean an electronic computation circuit or a data processing unit, such as an individual processor. Such an electronic circuit is designed to be able to generate an electrical signal on the basis of different electrical signals that it receives. The signal generated at the output of said neuron thus results from the transformation/integration of the data received as input, according to a transition function (the terms "activation function" and "transfer function" are also used).

Different types of artificial neuron design and architecture are already known to those skilled in the art. In a non-exhaustive way, the following can be cited: Axon-Hillock circuit, Integrate-and-fire neuron circuits, Leaky Integrate-and-fire neuron circuits, Hodgkin-Huxley neuron circuits (see J. Misra et al., Neurocomputing 74 (2010) 239-255; G. Indiveri et al., Frontiers in neuroscience 5 (2011) Article 73).

Moreover, "current conveyor" (or "current conveyor circuit") should be understood to mean an active current amplifier circuit having three ports, conventionally denoted X and Y for the two input ports and Z for the output port.

The principle of operation of the current conveyors, nowadays well known to those skilled in the art, can be represented by a matrix equation linking currents and voltages at its three ports.

Schematically, the property of the port X is to copy on its terminal the voltage applied at Y ($V_X=V_Y$).

The port X is also an input/output for a current $I_X$. The port Z supplies a current $I_Z=\alpha \cdot I_X$. For $\alpha>0$, the conveyor is said to be of positive type; for $\alpha<0$, the conveyor is said to be of negative type.

Finally, "artificial neuron unit" should be understood to mean an assembly of electronic components forming or intended to form all or part of a network of artificial neurons.

The invention thus relates to an assembly of electronic components consisting of a functional [artificial neuron/memristor/current conveyor] coupling or an assembly of electronic components incorporating at least one functional [artificial neuron/memristor/current conveyor] coupling.

An artificial neuron unit according to the invention thus comprises:
- at least one artificial neuron having at least one output port and at least one input port, and
- at least one memristor having two terminals; said unit being characterized in that it also comprises at least one current conveyor having two input ports X and Y, and one output port Z; and in which:
- said memristor (that is to say said at least one memristor) is connected by one of its terminals to the input port X of said current conveyor;
- said current conveyor (that is to say said at least one current conveyor) is connected by its output port Z to an input port of said artificial neuron (that is to say of said at least one artificial neuron);
- said artificial neuron (that is to say said at least one artificial neuron) is connected by one of its output ports to the input port Y of said current conveyor or to another of said terminals of said memristor.

According to a preferred implementation:
- the memristor is connected by one of its terminals to the input port X of the current conveyor;
- said current conveyor is connected by its output port Z to an input port of the artificial neuron;
- said artificial neuron is connected by one of its output ports to the input port Y of the current conveyor.

Thus, the conveyor ensures that the neuron receives at an input a current from the memristor and, at the same time, applies thereto the output voltage of the concerned neuron. Depending on the configuration of the conveyor, the above-mentioned current may be incoming or outgoing depending on whether an exciting or an inhibiting synapse is being produced. The conveyor therefore makes it possible to simultaneously apply an electrical signal to the neuron and to read thereon another signal resulting from the application of the former.

According to a functionally similar implementation:
- the memristor is connected by one of its terminals to the input port X of the current conveyor;
- said current conveyor is connected by its output port Z to an input port of the artificial neuron;
- said artificial neuron is connected by one of its output ports to another of said terminals of said memristor.

Whatever the implementation, an artificial neuron unit according to the invention advantageously comprises at least any one of the following features:
- the memristor is connected directly to the input port X of the current conveyor,
- the current conveyor is connected by its output port Z directly to an input port of the artificial neuron,
- the artificial neuron is connected by one of its output ports directly to the input port Y of said conveyor or directly to a terminal of the memristor.

Also, an artificial neuron unit according to the invention will also be able to advantageously comprise at least any one of the following features:
- the neuron or at least one of the neurons is a spiking neuron;
- the neuron or at least one of the neurons is a leaky integrate-and-fire neuron;
- the neuron or at least one of the neurons has a single output port;
- the neuron or at least one of the neurons has a single input port;
- the conveyor or at least one of the conveyors is a second generation current conveyor;
- the conveyor or at least one of the conveyors is arranged in such a way that there is a constant such that, regardless of the intensity of a current received at an input of the conveyor within a predetermined range of intensity values, a current outgoing from the conveyor exhibits an intensity equal to the product of this constant with the intensity of the received current (this constant can be a real number, positive or negative, integer or not);
- the conveyor or at least one of the conveyors is arranged to supply, at the output of the conveyor, a current identical to a current received at an input of the conveyor;
- the conveyor or at least one of the conveyors is arranged to supply, at the output of the conveyor, a current of the same intensity as a current received at an input of the conveyor and oriented in the opposite direction;
- the memristor or at least one of the memristors is arranged in such a way that a first voltage at its terminals leads to an increase in its resistance and a second voltage at its terminals of opposite sign to the first voltage leads to a decrease in its resistance; it is therefore a memristor with bipolar programming voltage or bipolar switching;
- the memristor or at least one of the memristors is a memristor with ferroelectric layer;
- the memristor or at least one of the memristors is connected between an input of the current conveyor or of at least one of the current conveyors, and the output of the neuron or of at least one of the neurons;
- the unit comprises at least two memristors, connected in parallel to one another, and connected to the input port X of a same current conveyor;
- the unit comprises at least two current conveyors connected by their output ports Z to an input port of one and the same artificial neuron;
- the unit comprises first and second conveyors, the first conveyor being arranged to supply, at the output of the first conveyor, a current identical to a current received at an input of the first conveyor and the second conveyor being arranged to supply, at the output of the second conveyor, a current of the same intensity as a current received at an input of the second conveyor and oriented in the opposite direction;
- the unit comprises at least two memristors connected to a first current conveyor and at least two other memristors connected to the second current conveyor; and
- the unit comprises memristors arranged in a network of memristors with transverse branches.

The invention extends also to any device, notably comprising at least one unit according to the invention.

BRIEF DESCRIPTION OF THE ACCOMPANYING DRAWINGS

Embodiments of the invention will now be described as non-limiting examples with reference to the attached drawings in which.

DETAILED DESCRIPTION OF THE PREFERRED EMBODIMENT

Memristors are components which have a resistance whose value depends on the electrical charge passing through them. In this case, the more the current passing through them increases, the more the value of the resistance decreases. This resistance value is non-volatile.

Here, a memristor with ferroelectric layer, as described in the application WO 2010/142762, is advantageously used. In this component, the changing of the resistance value is due solely to electronic effects and consequently preserves the component in itself. The component is based on a physical design that is radically different to the existing solutions: ferroelectricity with tunnel-effect junction.

Figure 1:
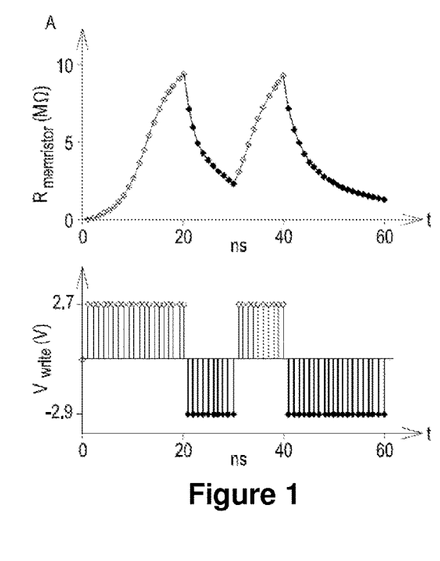
FIGS. 1 and 2 are curves illustrating the trend of the resistance of a memristor as a function of the bipolar voltage pulses which are applied to it.
Figure 2:
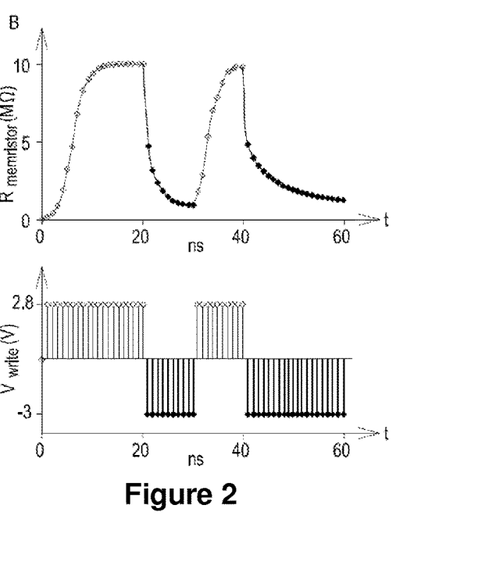

FIG. 1 illustrates, as a function of time, the voltage pulses $V_{write}$ applied to the terminals of the memristor in the bottom part of the figure, and the resistance $R_{memristor}$ of the component in the top part. Thus, a series of positive 2.7 V pulses is applied first, followed by a series of −2.9 V negative pulses. The same sequencing is then recommenced. It is observed that the value of the resistance increases as a function of the number of positive pulses. Then, the decreasing thereof is equally proportional to the number of negative pulses. This feature is used in the neural networks where the synaptic weights change as a function of the activity in terms of potential. The asymmetry is due to the construction of the device. In FIG. 2, the amplitude of the positive and negative pulses respectively becomes 2.8 V and −3 V. The increase and the reduction of the resistance are more rapid. There is also another interesting property: the amplitudes of the pulses situated between −2.45 V and 1.3 V do not modify the resistance value of the bipolar memristor. Consequently, the write and read modes depend on the voltage applied to the memristor. These two properties are used for the implementation of the plasticity rule.

Some indications on the plasticity of neural networks are now given below. The learning mechanisms are linked directly to the synaptic plasticity of the network. In artificial computation networks, the plasticity which depends on the timing of the spikes, also called spike-timing dependent plasticity (STDP), is commonly used. It is a type of synaptic modification which depends on the sequencing in time of the pre- and post-synaptic spikes. $\Delta t = t_{post} - t_{pre}$ is thus defined, in which $t_{pre}$ represents the instant of the pre-synaptic neuron event and $t_{post}$ the instant of the post-synaptic neuron event. When this interval is positive, the long-term potentiation (LTP) phenomenology increases the weight of the synapse, and when it is negative, the long-term depression (LTD) mechanism decreases the weight thereof.

In the context of the present implementation of the invention, each synapse between the pre- and post-synaptic neurons comprises a memristor. By virtue of their properties, the difference between the two instants of the plasticity dependent on the timing of the spikes is converted into a potential difference $V_{memristor}$, namely the potential difference at the terminals of the memristor. The form and amplitude of the spike of the neuron are therefore essential. The memristor conductance, equivalent to the synaptic weight, will therefore change only when the pre- and post-synaptic events occur within a brief time window, which means that the voltage between the neurons situated upstream and downstream is sufficient to cause a modification of weight. In the case of a single spike, the voltage of the spike lies within the range [−2.45 V; 1.3 V] and does not produce any weight modification.

Figure 3:
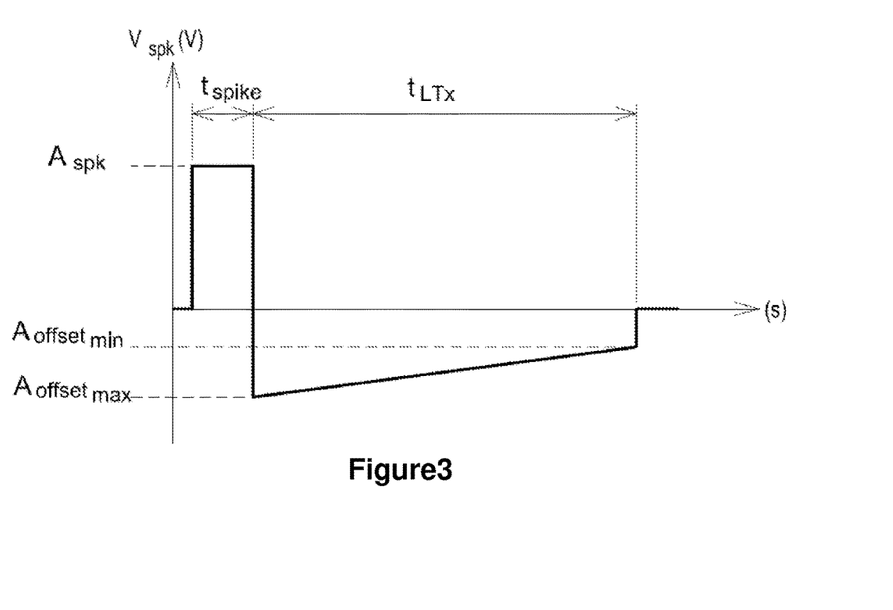
FIG. 3 is a curve illustrating the form of a spike used in the context of the invention.

In the case in point, the spike form illustrated in FIG. 3 is used. This form can be divided into two phases. The first phase which corresponds to the positive potential can be considered as the normal spike and its duration $t_{spike}$ governs the width of the voltage pulse applied to the terminals of the memristor for a possible modification of conductance. The second phase corresponds to the negative voltage and has a duration of $t_{LTx}$ which defines the time window during which the long-term potentiation and the long-term depression are taken into account. In the case in point, it is assumed that the durations $t_{LTP}$ and $t_{LTD}$ of these two phenomena are equal. The values $A_{spk}$ and $A_{offsetmax}$, which respectively form the highest and the lowest voltage values of the spike, are set such that no change of conductance of the memristor occurs when the spike is isolated. Nevertheless, the voltage $A_{spk} - A_{offsetmax}$ is sufficiently great to lead to a change of the synaptic weight.

Figure 4:
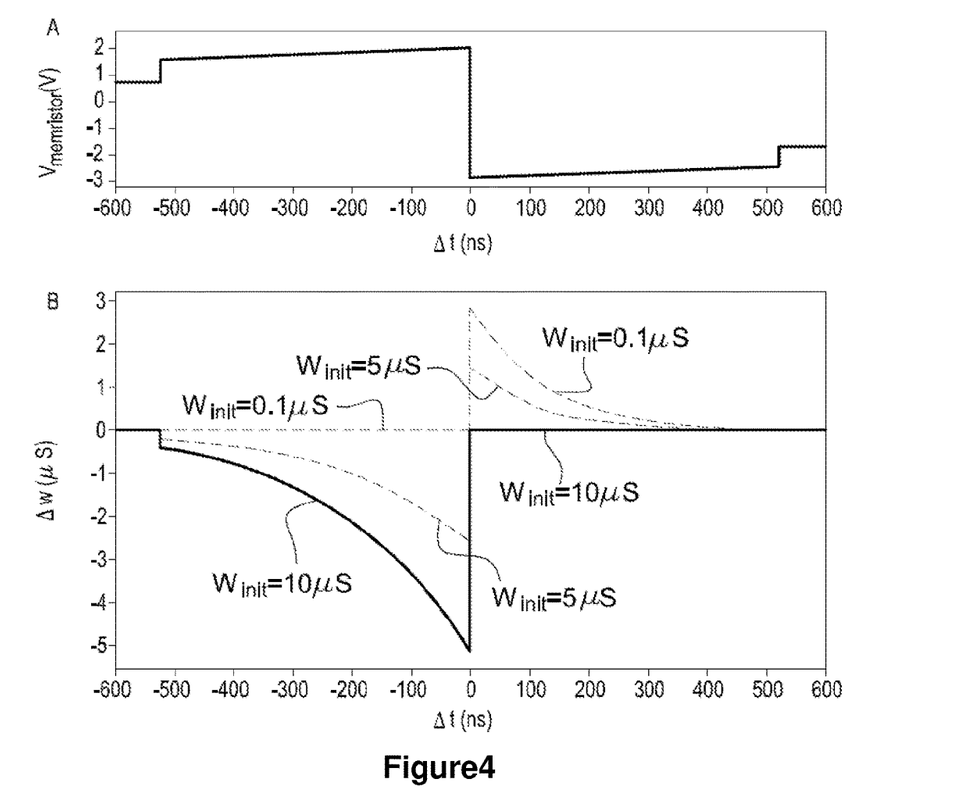
FIG. 4 shows curves similar to FIG. 1 in the case of the spike illustrated in FIG. 3.

The top part of FIG. 4 shows the correlation between the voltage applied to the memristor $V_{memristor}$ and the difference of instants $\Delta t$ between the pre- and post-synaptic spikes.

In the bottom part, this figure illustrates the variation $\Delta w$ of the conductance of the memristor as a function of $\Delta t$ for initial conductance values equal respectively to 10 μS, 5 μS and 0.1 μS. In this regard, a hysteresis effect of the memristor is observed. These curves show the representation of the STDP in a bipolar memristor.

The duration separating the pre- and post-synaptic spikes becomes a voltage applied to the memristor, as illustrated in the top part of FIG. 4. Given the chosen spike form, the more the absolute value of $\Delta t = t_{post} - t_{pre}$ approaches zero, the greater the voltage becomes. However, when $\Delta t$ is positive, the difference of potentials is negative such that the resistance decreases and the conductance (the synaptic weight) increases, and vice versa.

Figure 5:
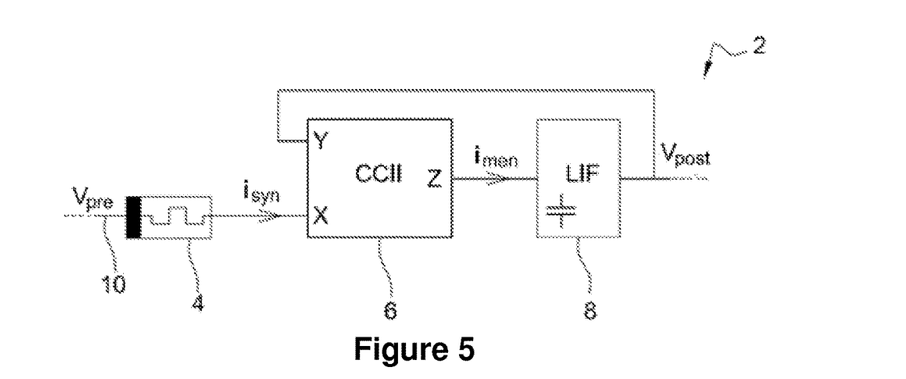
FIG. 5 is a diagram of a part of a device according to the invention showing the association of a memristor, a current conveyor and a neuron.

FIG. 5 shows an exemplary neuron unit 2 according to the invention. It comprises a memristor 4 as mentioned above, a current conveyor 6 and an artificial neuron 8. The memristor 4 is positioned to act as exciting synapse from the neuron 10 to the neuron 8.

The current conveyor 6 is a second generation current conveyor, or CCII. It comprises inputs X and Y and an output Z. As is known per se, this electronic component operates as follows. When a potential is applied to the input Y, this potential is copied at the output X. Moreover, the conveyor is arranged in such a way that there is a constant such that, regardless of the intensity of a current received at an input of the conveyor within a predetermined range of intensity values, a current outgoing from the conveyor exhibits an intensity equal to the product of this constant with the intensity of the received current. This constant can be positive or negative, integer or not, and equal as an absolute value to 1, 2, or 10 for example. In this particular case, either the current which enters through the input X is copied to exit at the output Z, or else the output from the output Z is a current of the same intensity but oriented in the reverse direction, depending on whether the conveyor is of CCII+ or CCII− type. The constant therefore has a value of 1 or −1. The memristor 4 is connected to the input X of the conveyor.

The neuron 8 is an analog neuron on silicon. Here, it is a leaky integrate-and-fire neuron, or LIF. This type of neuron constitutes a good trade-off between the range of the neurons in silicon and the effectiveness in terms of computations. The capacitor of the membrane of the neuron is charged or discharged when a spike is sent by the exciting or inhibiting synapse. In the case in point, the charge is performed by the negative part of the spike. The neuron is fired, that is to say generates a spike, when its membrane voltage exceeds a predetermined threshold.

The output Z of the conveyor is connected to an input of the neuron 8. Furthermore, the output of the neuron is connected to the input Y of the conveyor.

This setup constitutes a generic setup which can be easily reproduced in multiple copies in a network and used with exciting or inhibiting synapses in order to construct large neural networks that can fulfill computational functions.

By virtue of the properties of the current conveyor, the potential applied to the input X follows that applied to the input Y and which corresponds to the post-synaptic potential $V_{post}$. Consequently, the voltage at the terminals of the memristor is $V_{pre}-V_{post}$. The current supplied to the input X, which is the synaptic current $i_{syn}$, is supplied at the output Z either with a positive bias in the context of an exciting synapse or with a negative bias in the case of an inhibiting synapse. Consequently, the memristor current $i_{syn}$ is always introduced into the conveyor and the current $i_{mem}$ outgoing at Z is equal either to $i_{syn}$ or to $-i_{syn}$ depending on whether the synapse is exciting or inhibiting. The choice of the synapse type is made by virtue of a configuration bit (not illustrated in the figure) which sets the conveyor with a bias that is either positive or negative.

Figure 6:
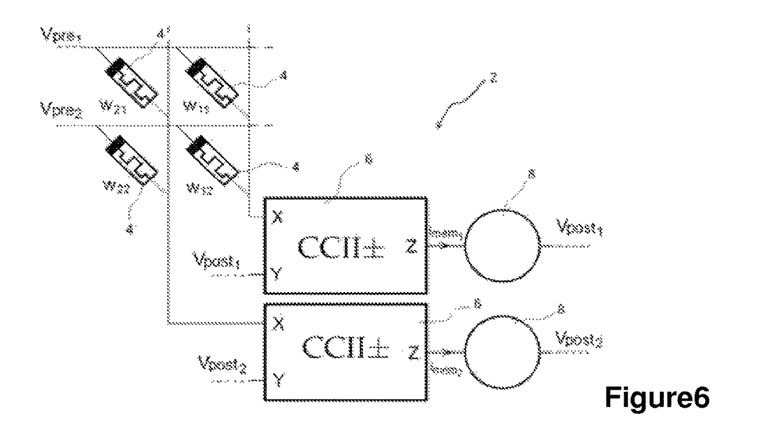
FIGS. 6, 7 and 8 are diagrams showing exemplary applications of the diagram of FIG. 5.
Figure 7:
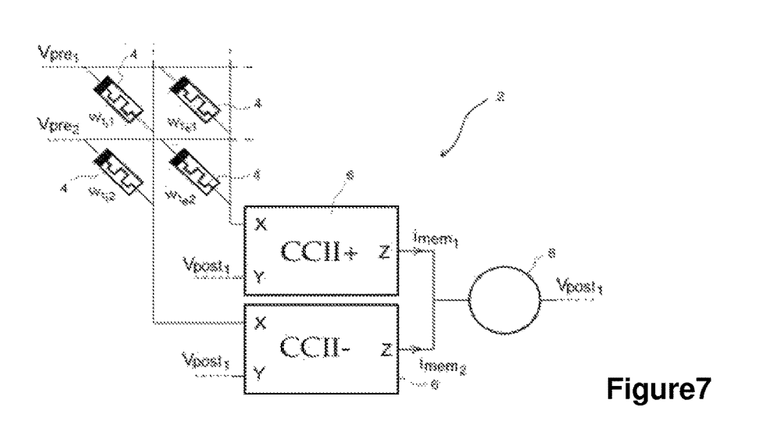

This solution has the advantage of being able to be extended to a large neural network by providing for there to be the memristors 4 in transverse position in a matrix with rows and columns, as illustrated in FIGS. 6 and 7.

This FIG. 6 thus shows a general setup comprising memristors 4 (denoted $W_{11}$, $W_{12}$, $W_{21}$ and $W_{12}$). Here, there are four of these memristors for clarity of explanation, but it goes without saying that there can be more thereof.

The memristors $W_{11}$ and $W_{21}$ which extend on a same first row of the matrix have a terminal connected to a same potential $V_{pre1}$. Similarly, the other two memristors $W_{12}$ and $W_{22}$ which extend on a same second row of the matrix have a terminal connected to a same potential $V_{pre2}$.

The setup comprises two current conveyors 6, identical or different, exciting or inhibiting.

The other terminal of the memristors $W_{11}$ and $W_{12}$, situated in a same first column of the matrix, is connected to the input X of a first conveyor 6 whereas the other terminal of the memristors $W_{21}$ and $W_{22}$, situated in a same second column of the matrix, is connected to the input X of the second conveyor 6.

The first conveyor 6 produces, at the output Z, a current $i_{mem1}$ which is the sum of the currents $i(W_{11})$ and $i(W_{12})$ which pass respectively through the memristors $W_{11}$ and $W_{12}$. This current $i_{mem1}$ is sent to a first artificial neuron 8.

The second conveyor produces, at the output Z, a current $i_{mem2}$ which is the sum of the currents $i(W_{21})$ and $i(W_{22})$ which pass respectively through the memristors $W_{21}$ and $W_{22}$. This current $i_{mem2}$ is sent to a second artificial neuron 8.

FIG. 7 shows a setup comprising four memristors 4 (denoted $W_{1,i1}$, $W_{1,e1}$, $W_{1,i2}$, $W_{1,e2}$).

The memristors $W_{1,i1}$ and $W_{1,e1}$ which extend on a same first row of the matrix starting from the top have a terminal connected to a same potential $V_{pre1}$. Similarly, the other two memristors $W_{1,i2}$ and $W_{1,e2}$ which extend on a same second row of the matrix have a terminal connected to a same potential $V_{pre2}$.

The setup comprises two current conveyors 6 respectively of CCII+ and CCII− type.

The other terminal of the memristors $W_{1,i1}$ and $W_{1,i2}$, situated in a same first column of the matrix, is connected to the input X of the inhibiting conveyor 6, whereas the other terminal of the memristors $W_{1,e1}$ and $W_{1,e2}$, situated in a same second column of the matrix, is connected to the input X of the exciting conveyor 6. The latter produces, at the output Z, a current $i_{mem1}$ which is the sum of the currents $i(W_{1,e1})$ and $i(W_{1,e2})$ which pass respectively through the memristors $W_{1,e1}$ and $W_{1,e2}$. The inhibiting conveyor produces, at the output Z, a current $i_{mem2}$ which exhibits an intensity equal to the sum of the intensities of the currents $i(W_{1,i1})$ and $i(W_{1,i2})$ which pass respectively through the memristors $W_{1,i1}$ and $W_{1,i2}$ but of opposite direction. Downstream of the conveyors, the two currents $i_{mem1}$ and $i_{mem2}$ are added together and sent to a same neuron 8.

Figure 8:
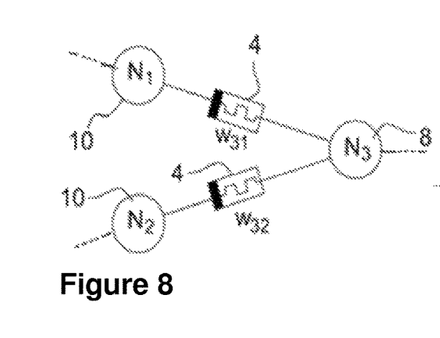

Another exemplary setup used for simulations is illustrated in FIG. 8. This network comprises two pre-synaptic neurons 10 ($N_1$ and $N_2$) and a post-synaptic neuron 8 ($N_3$) which are all leaky integrate-and-fire neurons. The two pre-synaptic neurons 10 are connected to the post-synaptic neuron 8 via, respectively, an exciting synapse $W_{31}$ and an inhibiting synapse $W_{32}$ each comprising a memristor 4. Each memristor has an associated current conveyor arranged between the memristor and the post-synaptic neuron and which has not been illustrated. The conveyors and the neurons are designed according to a 0.18 μm CMOS technology from the company Austriamicrosystems. Each memristor 4 is modeled for the simulation in the form of a memristor model in Veriloga language. The simulations were performed with the Analog Design Environment tool from the company Cadence and its Spectre simulator.

Figure 9:
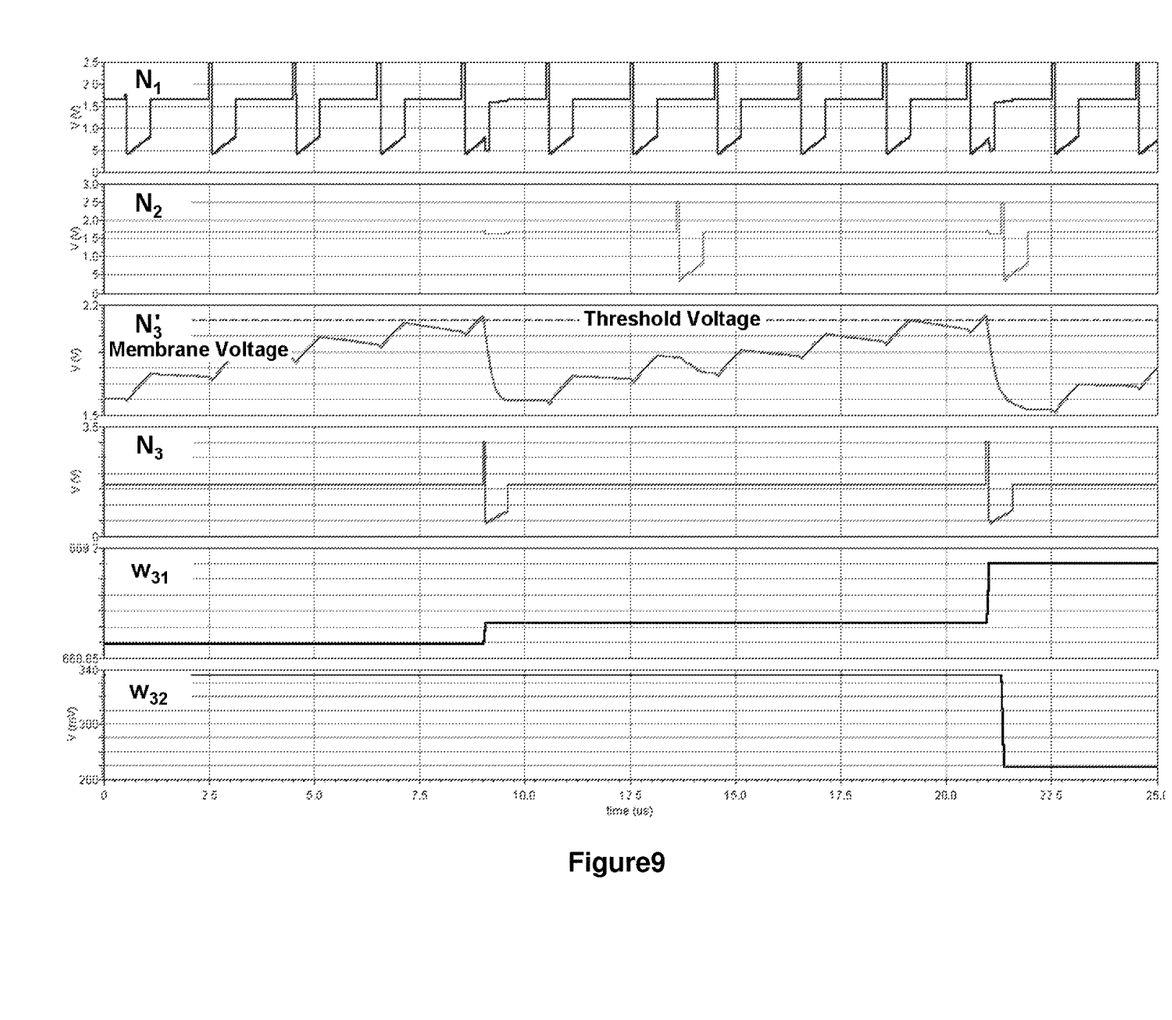
FIG. 9 shows experimental curves obtained by simulation by means of the diagram of FIG. 8.

The result of the simulations is illustrated in FIG. 9. The latter presents curves illustrating, as a function of time, the trend of the potential or of the potential difference at the terminals of the memristors and of the neurons.

The curve $N_1$ shows spikes produced with a regular timing by the neuron $N_1$, these potentials each having the form illustrated in FIG. 3.

The exciting synapse associated with its memristor $W_{31}$ therefore charges the membrane capacitor of the neuron $N_3$, as indicated on the curve $N'_3$. Between two successive spikes of the neuron $N_1$, the voltage of the membrane of $N_3$ decreases slowly because of the leakage currents in the case of a leaky integrate-and-fire neuron. In the region of 9 μs, this voltage reaches the threshold which fires the neuron $N_3$. The neuron therefore produces a spike and its membrane voltage is reset. At this instant, it is observed that the difference $t_{N3}-t_{N1}$ is positive such that the conductance of the memristor changes and increases as indicated in the curve $W_{31}$. Previously, this conductance had remained constant.

In the region of the instant 13.5 μs, when the neuron $N_2$ in turn sends a spike, the inhibiting synapse $w_{32}$ discharges the membrane capacitor of the neuron $N_3$. In this case, the post-synaptic neuron $N_3$ does not fire and the conductance $w_{32}$, having remained constant, does not change.

In the region of 21 μs, the spikes of the neuron $N_1$ generate a post-synaptic spike. The difference of instants $t_{N3}-t_{N1}$ is positive such that the conductance $w_{31}$ increases more and the membrane potential of $N_3$ is reset.

A few hundreds of nanoseconds later, the neuron $N_2$ sends a spike. Then, the membrane voltage of the neuron $N_3$ continues to decrease because of the current of the inhibiting synapse. In this case, the difference $t_{N3}-t_{N2}$ is negative such that the conductance $W_{32}$ decreases.

Figure 10:
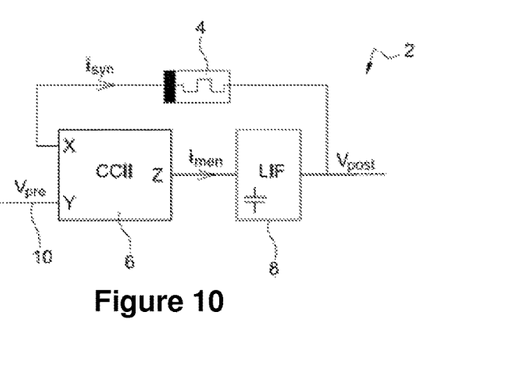
FIG. 10 illustrates a variant embodiment of the diagram of FIG. 5.

FIG. 10 shows a setup constituting a variant of that of FIG. 5. As previously, the memristor 4 is connected to the input X of the conveyor 6. However, this time it is also connected to the output of the neuron 8. The potential $V_{pre}$ of the pre-synaptic neuron 10 is applied to the input Y of the conveyor. The rest of the setup is unchanged.

The operation is the same as that of FIG. 5. In effect, the conveyor 6 copies the potential $V_{pre}$ from the input Y to the input X such that the memristor sees, at its terminals, a potential difference $V_{post}-V_{pre}$. This difference modifies the value of the conductance of the memristor, which represents the weight of the synapse produced.

The conveyor copies the current $i_{syn}$ passing through the memristor on the pole Z such that $i_{mem}=\alpha \cdot i_{syn}$ or $i_{mem}=-\alpha \cdot i_{syn}$ depending on the type of conveyor, that is to say depending on whether an exciting or inhibiting synapse is being produced.

The invention makes it possible to use the phenomenon of plasticity of the memristor in an artificial neural network, to produce an exciting or inhibiting synapse. The invention therefore makes it possible to produce, in neural networks, exciting or inhibiting plastic memristive synapses.

Also, it provides a solution that uses little silicon surface area.

Such neural networks can be used for recognition, exploration and synthesis operations and, more generally, in information processing applications.

Obviously, numerous modifications will be able to be made to the invention without departing from the scope thereof.

The invention claimed is:

1. An artificial neuron unit comprising:
   at least one artificial neuron having at least one output port and at least one input port, and
   at least one memristor having two terminals; said unit being characterized in that it also comprises at least one current conveyor having two input ports X and Y, and one output port Z; and in which:
   one of the terminals of said memristor is connected to the input port X of said current conveyor;
   said current conveyor is connected by its output port Z to an input port of said artificial neuron;
   said artificial neuron is connected by one of its output ports to the input port Y of said current conveyor or to another of said terminals of said memristor.

2. The artificial neuron unit according to claim 1, in which said artificial neuron is a spiking neuron.

3. The artificial neuron unit according to claim 1, in which said neuron is a leaky integrate-and-fire neuron.

4. The artificial neuron unit according to claim 1, in which said neuron has a single output port.

5. The artificial neuron unit according to claim 1, in which said neuron has a single input port.

6. The artificial neuron unit according to claim 1, in which said current conveyor is a second generation conveyor.

7. The artificial neuron unit according to claim 1, in which said conveyor is arranged in such a way that there is a constant such that, regardless of the intensity of a current received at an input of the conveyor within a predetermined range of intensity values, a current outgoing from the conveyor exhibits an intensity equal to the product of this constant with the intensity of the received current.

8. The artificial neuron unit according to claim 1, in which said conveyor is arranged to supply, at the output of said conveyor, a current identical to a current received at an input of the conveyor or is arranged to supply, at the output of the conveyor, a current of the same intensity as the received current and oriented in the opposite direction.

9. The artificial neuron unit according to claim 1, in which said memristor is a memristor with ferroelectric layer.

10. The artificial neuron unit according to claim 1, in which:
    said memristor is connected by one of its terminals to the input port X of said current conveyor;
    said current conveyor is connected by its output port Z to an input port of said artificial neuron;
    said artificial neuron is connected by one of its output ports to the input port Y of said current conveyor.

11. The artificial neuron unit according to claim 1, which comprises at least two memristors, connected in parallel to one another, and connected to the input port X of a same current conveyor.

12. The artificial neuron unit according to claim 1, which comprises at least two current conveyors connected by their output ports Z to an input port of one and the same artificial neuron.

13. The artificial neuron unit according to claim 1, which comprises first and second conveyors, said first conveyor being arranged to supply, at the output of said first conveyor, a current identical to a current received at an input of said first conveyor and said second conveyor being arranged to supply, at the output of said second conveyor, a current of the same intensity as a current received at an input of said second conveyor and oriented in the opposite direction.

14. The artificial neuron unit according to claim 1, which comprises memristors arranged in a network of memristors with transverse branches.

* * * * *